Sept. 29, 1931.   E. SCHWETER   1,825,163
DEVICE FOR ALTERING THE CLEARANCE SPACE IN PISTON MACHINES
Filed Dec. 19, 1927   3 Sheets-Sheet 1

Sept. 29, 1931.  E. SCHWETER  1,825,163
DEVICE FOR ALTERING THE CLEARANCE SPACE IN PISTON MACHINES
Filed Dec. 19, 1927   3 Sheets-Sheet 2

Sept. 29, 1931.      E. SCHWETER      1,825,163
DEVICE FOR ALTERING THE CLEARANCE SPACE IN PISTON MACHINES
Filed Dec. 19, 1927      3 Sheets-Sheet 3
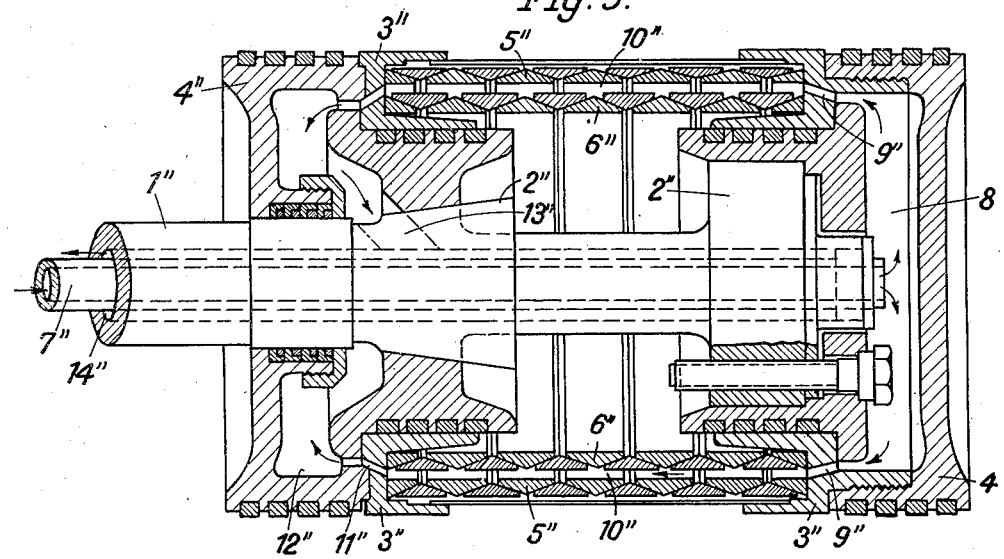
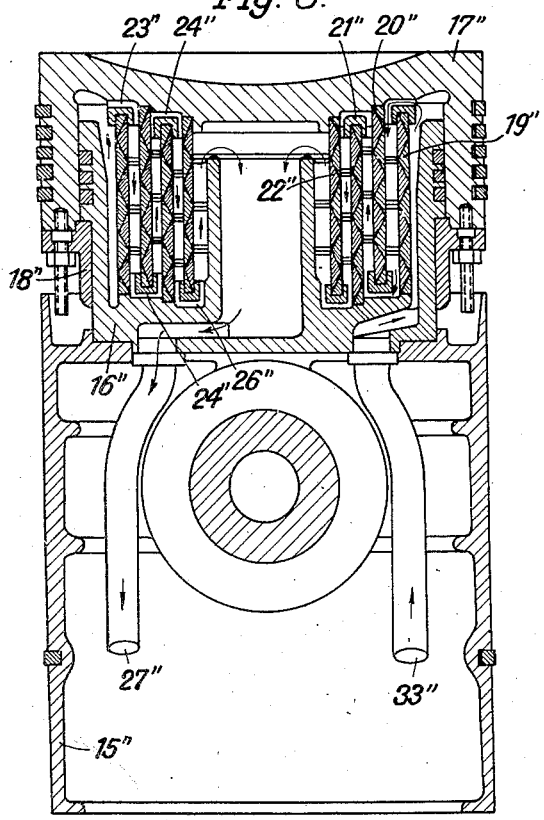
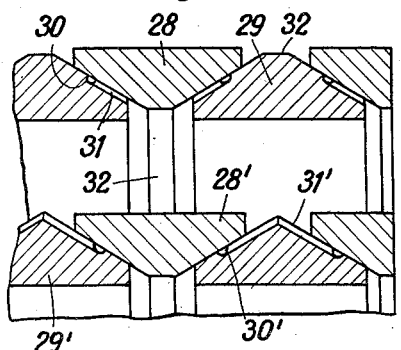
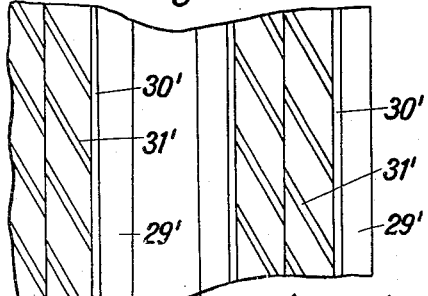
Inventor:
Erich Schweter
By B. Singer, Atty.

Patented Sept. 29, 1931

1,825,163

UNITED STATES PATENT OFFICE

ERICH SCHWETER, OF BORNSTEDT, GERMANY

DEVICE FOR ALTERING THE CLEARANCE SPACE IN PISTON MACHINES

Application filed December 19, 1927, Serial No. 241,249, and in Germany August 2, 1926.

The invention relates to an arrangement for altering the clearance space, preferably in internal combustion engines, with pistons consisting of two parts, between which a spring is inserted, one part being movable inside the other in axial direction, in order to prevent excessively high compressions at loading under pressure and consequently inadmissible stresses in the driving gear which would endanger the same.

The invention consists therein, that besides the spring action a cushion or damping effect by a cushioning device is provided. The advantage of the invention consists therein, that the shocks at each stroke in either direction of the piston parts are safely cushioned, so that the working of the piston becomes reliable and a long duration of the same is obtained, even if the device is permanently acting, not only as a security device for emergency cases.

Further features of the invention consist in providing a liquid medium under pressure in the space between both piston ends, and in constructing the spring in the manner of the so called friction springs, composed of separate rings, and in similar means for producing a softening effect.

When a spring and a liquid are used simultaneously, the spring is so dimensioned according to the invention, that it balances the friction, the acceleration and the normal pressure load of the movable piston part, while the pressure of the liquid must be chosen so as to balance the combustion overload by accordingly enlarging the clearance space. The liquid pressure therefore needs not to be very high.

The movement of the piston parts against each other is limited by a valve seat like tightening abutment, so that the greatest enlargement of the clearance space is fixed to a certain limit.

The liquid is according to the invention used for cooling the spring and the piston, a circulating system with a cooler being provided. The liquid can be admitted by any usual means, as f. i. link pipes or telescopic tubes or by borings in the piston rods or connecting rods.

The new arrangement can be used for small and large, single acting and double acting motors. The use of the friction spring produces a soft and smooth working even at high number of revolutions, so that the new arrangement can be used for high speed motors, f. i. in automobiles and aeroplanes, and also in motor locomotives, in which the feeding of the air charge under pressure by special blowers is of great importance, especially for increasing the power for a time during starting.

For double acting motors the invention provides a middle piston part, two piston ends, movable against said middle part, and a common spring and cushioning device between said movable piston ends. Thus a very simple arrangement produces precisely equal alterations of the clearance spaces on both cylinder ends, and a soft cushioning effect is reached by the amply dimensioned spring using all the available space between the movable piston ends.

In order to obtain greater working safety and less stress in the spring, the invention further provides two or more separate springs between the piston ends, so that in the case of breakage of one spring the other or others are still able to balance elastically the live forces and to prevent a destruction of the piston. Hereby less heating of the springs is attained in consequence of the smaller load on each spring and also in consequence of the better cooling, if according to the invention the cushioning and cooling liquid is passed through the spaces between the single springs so as to cool and lubricate the springs. This cooling and lubricating effect is increased by grooves on the loaded surfaces of the springs.

Further objects of the invention will appear in the detailed description.

In the drawings several samples of the invention are shown:

Figure 3:
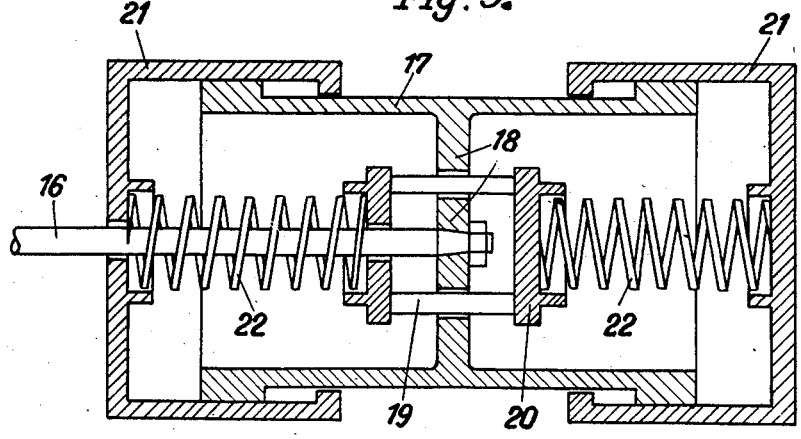
Figure 4:
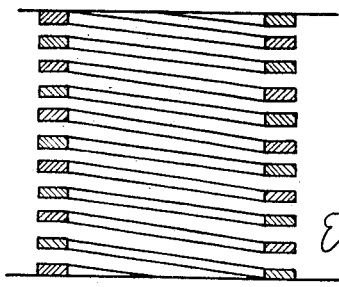

Fig. 3 is a schematical longitudinal section of another construction of a double acting piston, Fig. 4 is a longitudinal section of a spring for the piston shown in Fig. 3, Fig. 5 is a longitudinal section of a double acting piston with two springs, Fig. 6 is a longitudinal section of a single acting piston with four springs, Fig. 7 is an enlarged section of two adjoining spring coils, Fig. 8 is a top view of the loaded surfaces of the spring coils as provided with ring and oblique grooves.

Figure 1:
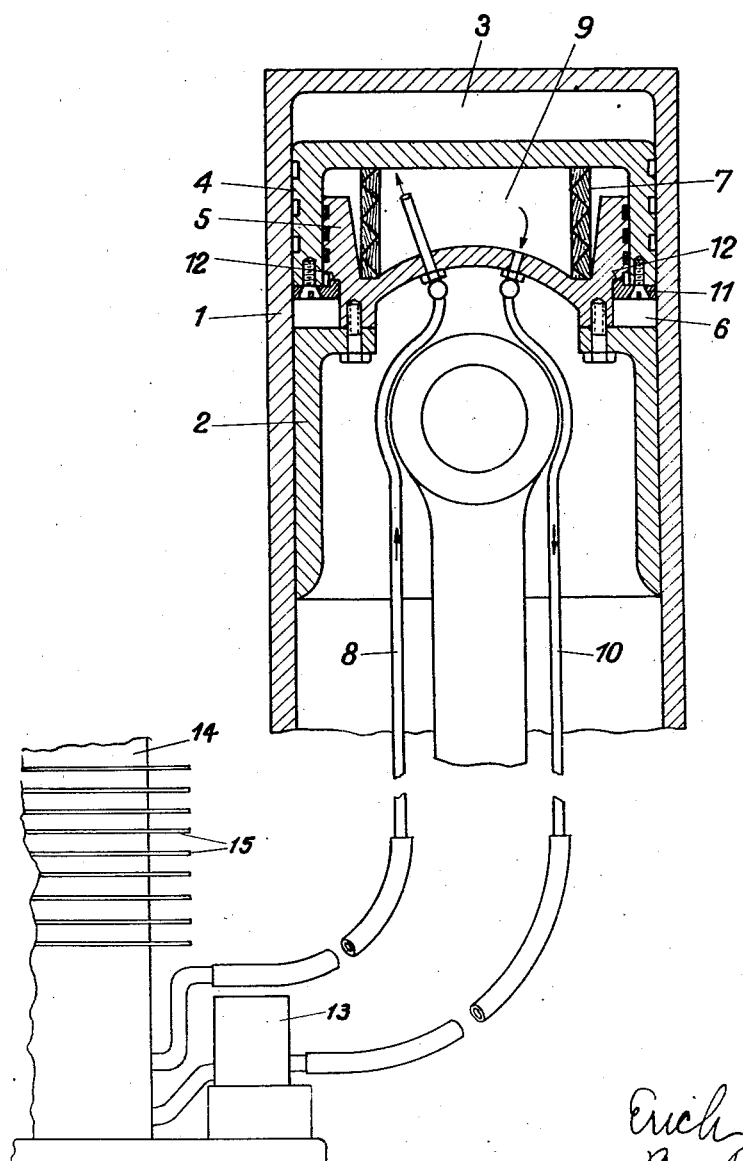
Fig. 1 is a longitudinal section of a single acting piston.

In Fig. 1, in a cylinder 1 of a single acting motor glides a piston 2, whose end part adjoining the clearance space 3 consists of a head 4 and an inner part 5. The part 5 is screwed strongly to the piston 2 and glides inside the head 4, being tightened against it by piston rings. The head 4 glides in the cylinder 1 and is provided with the usual piston rings. Fig. 1 shows the position of the smallest i. e. the normal clearance space. The height of the space 6 corresponds to the stroke of the head 4 against the inner part 5, i. e. to the degree of the possible increase of the clearance space 3. A friction spring 7, consisting of separate rings of triangular cross sections, is inserted inside the part 5 between the inner circular surface of the head 4 and the piston 2. A pressure liquid, f. i. oil, is admitted to the space 9 between the parts 4 and 5 by a link pipe 8 and leaves said space by a link pipe 10. The pipes 8 and 10 are to be fed by a circulating pump 13 and an air vessel 14 or another pressure accumulator which is partly filled with the liquid, so as to form a liquid circulating system, in which any necessary pressure can be produced and regulated. By adding a cooler to the system or by arranging the air vessel as a cooler as shown at 15 the liquid can be cooled: An abutment ring 11 screwed to the part 4, and coacting with a tightening ring seat 12 limits the stroke of the part 4. The seat and abutment ring are preferably ground. The liquid is hereby prevented from penetrating at highest position of the part 4 from the space 9 into the space 6 and disturbing the action of the device.

Figure 2:
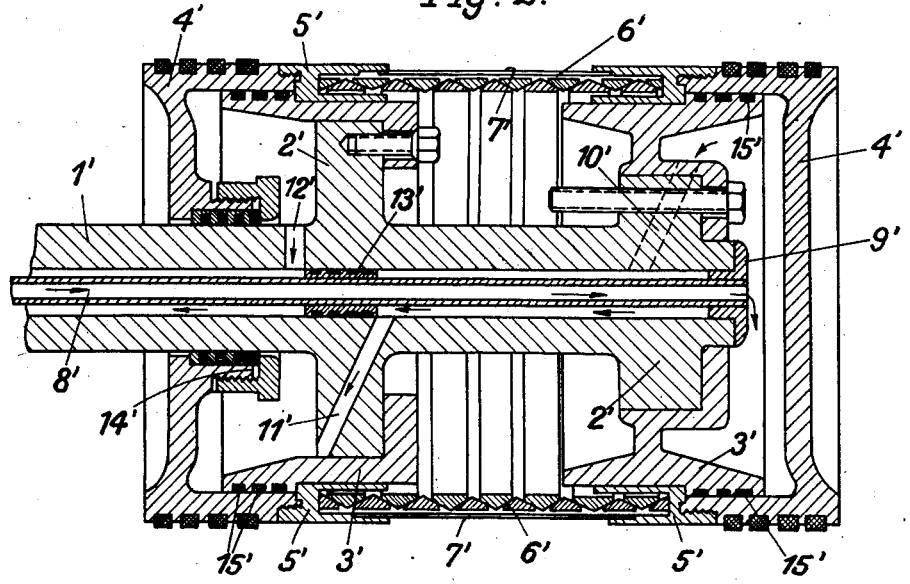
Fig. 2 is a longitudinal section of a double acting piston.

According to Fig. 2 the piston rod 1' is provided with two flanges 2', to which guiding parts 3' are screwed. Heads 4' are strongly connected to gliding parts 5' which glide on the guiding parts 3'. The parts 4', 5' glide in the cylinder, while the guiding parts 3' glide inside the parts 4', 5'. A spring 6' is inserted between the parts 5'. A mantle 7', fixed to one of the parts 5' and movable on the other, protects the spring 6' and prevents the leakage of oil from the space inside the middle part, where it flows for lubricating the spring 6'. The piston rod 1' is hollow and contains a pipe 8', so that a circular ring space is provided between the rod and the pipe. A flange 9' closes the entrance to the circular space between the piston, rod end and the pipe 8'. The cushioning liquid, f. i. pressure oil, enters by the pipe 8' into the space between one piston head 4' and the part 3', and flows through the channel 10' into the ring space in the piston rod, from here through a channel 11' into the second piston head and at last through a channel 12' again into the piston rod ring space and to a pump or cooler. A ring 13' completes said circulating scheme. A stuffing box 14' with tightening rings is provided in the one piston head. Piston rings 15' tighten the parts 4' against the parts 3'. The leakage oil from all gliding and tightening surfaces enters into the space in the middle piston part and lubricates the spring 6', which in Fig. 2 is shown as a friction spring, which could produce also the cushioning effect and make hereby the liquid as a cushioning medium unnecessary.

If the cushioning effect is to be produced only by the liquid, a spring according to Fig. 4 is used with advantage. Two or more springs may be arranged like a double or multiple thread screw or one inside the other for obtaining less load on each spring and uniform distribution of the spring force.

According to Fig. 3 the piston rod 16 is fastened to a flange 18 of a piston middle part 17. Connecting parts 19 of a cage like part 20 pass through holes in said flange, so that the part 19, 20 is movable in both longitudinal directions. Springs 22 (which may correspond to Fig. 4) are provided between the movable piston heads 21 and the part 20. If a cushioning effect is produced solely or additionally by a pressure liquid the piston ends must be constructed according to Fig. 2.

According to Fig. 5 a hollow piston rod 1", two flanges 2" as direct or indirect guidings for gliding parts 3", and piston heads 4" are arranged in similar manner, as shown in Fig. 2. Two layers of friction springs 5", 6" are inserted between said gliding parts 3". The cooling and lubricating pressure oil streams through a pipe 7", placed inside the rod 1", into the one end space 8" and then through channels 9" into the space 10" between the two layers of springs 5", 6", then through channels 11" into the space 12" of the other piston end, then through a channel 13" of the flange 2" into the ring space 14" and further to the pump. The very small quantity of oil penetrating into the space between the both flanges 2" passes the gliding surfaces of the flanges and guiding parts into one of the spaces 8", 12" and leaves those in the described manner.

According to Fig. 6 a guiding part 16" is fastened to the lower part 15" of a single acting piston, the piston head 17" gliding on said part 16". A part 18" guides the head 17" and limits its movement. Friction spring layers 19", 20", 21", 22" are inserted between the part 16″ and the head 17″. The pressure liquid enters through a pipe 33″ into the upper part of the piston, reaches the ring space between the guiding part 16″ and the first spring layer 19″, then flows through a channel 23″ to the next spring layers 20″, then through a channel 24″ to the next layer 21″, then through a channel 25″ to the next layer 22″ and at last through a channel 26″ into the space between the parts 16″, 17″, and from here through a pipe 27″ to the pump. In this manner all spring layers are lubricated and cooled.

According to Figs. 7 and 8 two adjoining spring layers consist of rings 28, 28′ subjected to tension stresses, and ring 29, 29′ subjected to pressure stresses. The liquid flows between said both layers. Circular grooves 30, 30′ are provided on the outer friction surface, oblique grooves 31, 31′ connecting said circular grooves with the oil stream between the layers. As the oil pressure needs not be very high, there is so much oil leakage between the working ring surfaces. The rings are with advantage flattened at their middle parts 32, so that in working the adjoining circular edges of coacting rings overrun each other. Also grooves overrunning each other may be provided for the same purpose. The friction surface remains hereby clean and smooth and seizing is prevented.

It will be understood, that the arrangements more particularly described and illustrated have been given by way of examples only and that modifications may be made without departing from the scope of the invention.

I claim:

1. Device for altering the clearance space in piston machines, comprising in combination a piston including a bottom part and a head part, said bottom part being axially movable against the said head part, a spring arranged between said bottom part and said head part, a pressure liquid provided between said bottom part and said head, for producing a damping action between them means providing a throttling exit for said liquid and means for again introducing liquid, said spring being of such dimensions as to balance the friction, acceleration and the normal pressure load of the movable piston head, and the pressure of the liquid being chosen so as to yield under supernormal combustion pressures and enlarge the clearance space.

2. Device for altering the clearance space in piston machines, comprising in combination a piston including a bottom part and a head, said bottom part being axially movable against the head, a spring arranged between said bottom part and said head and means for producing a damping action between said bottom part and said head, a pressure liquid provided between said bottom part and said head, means providing a throttling exit for said liquid, means for again introducing liquid, and a circulating cooling system for said liquid, said system consisting of a piping, a pump and a cooling device.

3. Device for altering the clearance space in piston machines, comprising in combination a piston consisting of a middle part and two end parts axially movable against said middle part, a common spring provided between said movable parts and means for producing a cushioning action between said movable parts.

4. Device for altering the clearance space in piston machines, comprising in combination a piston consisting of a middle part and two end parts axially movable against said middle part, a common spring provided between said movable part and means for producing a cushioning action between said movable parts, surrounding said middle part.

5. Device for altering the clearance space in piston machines, comprising in combination a piston consisting of a middle part and two end parts axially movable against said middle part, a common spring device provided between said movable parts and means for producing a cushioning action between said movable parts, said spring device consisting of more than one spring, the coils of said springs being interposed in the manner of a multiple thread screw so as to obtain a uniform load distribution.

6. Device for altering the clearance space in piston machines, comprising in combination a piston consisting of a middle part and two end parts axially movable against said middle part, a common spring provided between said movable parts, means for producing a cushioning action between said movable parts, and guiding parts between said end parts and said middle part, said guiding parts serving simultaneously as holders for said spring.

7. Device for altering the clearance space in piston machines, comprising in combination a piston including at least two parts movable against each other, and at least two coaxial springs of the friction spring type of different ring diameters, said springs being concentrically arranged, one surrounding the other and being interposed between said movable parts for producing a dampening action between said parts.

8. Device for altering the clearance space in piston machines, comprising in combination a piston consisting of at least two parts movable against each other a spring of the friction spring type interposed between said movable parts, a pressure liquid, and means for leading said liquid to said spring so as to cool and lubricate the same.

9. Device for altering the clearance space in piston machines, comprising in combination a piston consisting of at least two parts movable against each other and at least two coaxial springs of the friction spring type of different ring diameters, said springs being interposed between said movable parts and parallelly surrounding each other, a pressure liquid, and means for leading said liquid through the ring spaces between each pair of springs so as to cool and lubricate the same.

10. Device for altering the clearance space in piston machines, comprising in combination a piston consisting of at least two parts movable against each other a spring of the friction spring type interposed between said movable parts, a pressure liquid, and means for leading said liquid to said spring and circular grooves provided on the working surfaces of said spring rings, subjected to pressure stresses, said grooves being connected to the spaces passed by the liquid.

11. Device for altering the clearance space in piston machines, comprising in combination a piston consisting of at least two parts movable against each other a spring of the friction spring type interposed between said movable parts, a pressure liquid, and means for leading said liquid to said spring, and oblique grooves on the working surface of said spring rings said oblique grooves extending only over a part of the surface breadth so, that a tightening working surface remains not broken by grooves.

12. Device for altering the clearance space in piston machines, comprising in combination a piston consisting of at least two parts movable against each other a spring of the friction spring type interposed between said movable parts, a pressure liquid, and means for leading said liquid to said spring, the contacting surfaces of said spring rings being provided with circumferential excavations so as to form coacting edges of the adjoining rings, overrunning each other when working.

13. Device for altering the clearance space in piston machines, comprising in combination, a cylinder, power transmitting means, a piston movable in said cylinder and connected to said power transmitting means, a piston bottom displaceable against said piston, a spring active to remove said bottom from said piston, and energy absorbing means for damping the displacements of said bottom with respect to said piston.

14. Device for altering the clearance space in piston machines, comprising in combination a piston including a bottom part and a head, said bottom part being axially movable against the head, a spring arranged between said bottom part and said head, a liquid under pressure between said bottom part and said head to produce damping action therebetween, a throttling exit duct for said liquid, and means for reintroducing liquid.

15. Device for altering the clearance space in piston machines, comprising in combination, a cylinder, power transmitting means, a piston movable in said cylinder and connected to said power transmitting means, a piston bottom displaceable against said piston, and a metallic spring having parts in frictional contact with one another, and arranged to move said bottom from said piston.

16. A piston of the class described, having a head movable toward and from the inner end of said piston, and forming a chamber between them, a spring in said chamber active to move said head from the inner end of the piston, and means to supply liquid under pressure to said chamber, to damp movement of the head toward the inner end of the piston, said liquid supply means including means to keep the liquid in circulation to and from the said chamber.

In witness whereof I affix my signature.
ERICH SCHWETER.